UNITED STATES PATENT OFFICE.

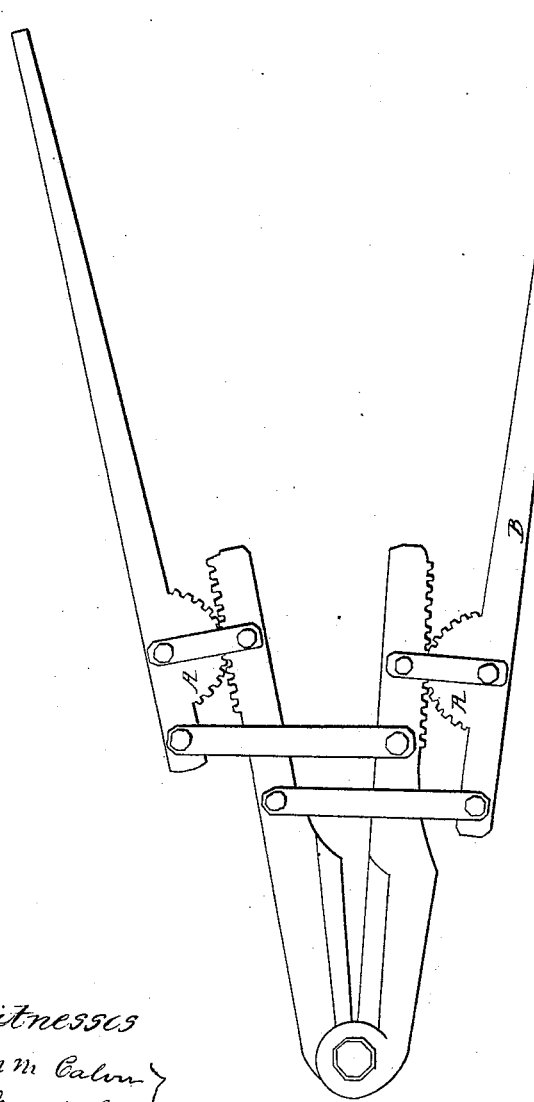

THEODORE WALLIS AND THOMAS WITBECK, OF SCIPIO, NEW YORK.

IMPROVED HAND SHEARS OR NIPPERS.

Specification forming part of Letters Patent No. 46,960, dated March 21, 1865.

*To all whom it may concern:*

Be it known that we, THEO. WALLIS and THOS. WITBECK, of the town of Scipio, in Cayuga county, and State of New York, have invented a new and useful Improvement in Hand Shears or Nippers; and we do hereby declare that the following is a full, clear, and exact description of the same, reference being had to the accompanying drawing, and to the letters of reference marked thereon.

The nature of our invention consists in the employment of two "half cogwheels" and one double lever, (to be hereinafter described, greatly increasing the power by throwing out the single lever in former patent issued to THEO. WALLIS, and dated April 16, 1864.

The drawing represents a side view of the nippers.

A A represent the half cog wheels and B the double lever, throwing out the single lever in former patent.

What we claim as new, and desire to secure by Letters Patent, is—

The toothed segmental fulcrumed lever B, in combination with the shears and attached thereto, and operating thereby the stirrups, all constructed as herein described.

THEODORE WALLIS.
THOMAS WITBECK.

Witnesses:
M. M. CULVER,
MERRITT GALLY.